Aug. 31, 1954

F. L. HUNT, JR
AUTOMOBILE HEATER 2,687,684

Filed Oct. 4, 1950

INVENTOR.
BY Fred L. Hunt, Jr.

ATTORNEYS.

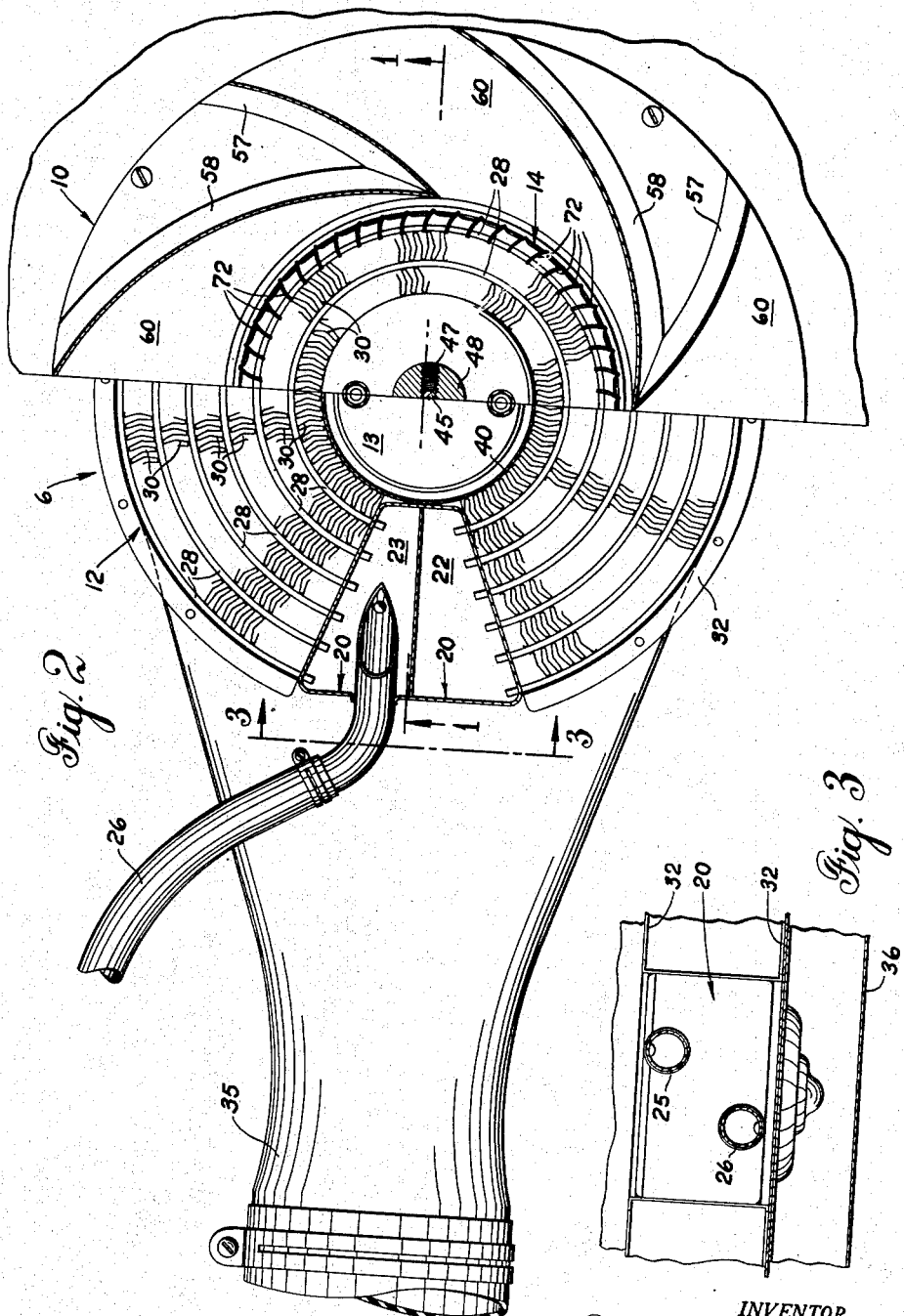

Aug. 31, 1954     F. L. HUNT, JR     2,687,684
AUTOMOBILE HEATER

Filed Oct. 4, 1950

INVENTOR.
Fred L. Hunt Jr.
BY
ATTORNEYS.

Patented Aug. 31, 1954

2,687,684

UNITED STATES PATENT OFFICE 2,687,684

AUTOMOBILE HEATER

Fred L. Hunt, Jr., South Bend, Ind., assignor to The Studebaker Corporation, South Bend, Ind., a corporation of Delaware Application October 4, 1950, Serial No. 188,432

2 Claims. (Cl. 98—2)

My present invention relates to an improvement in automobile heating and ventilating apparatus.

Many forms of apparatus have been developed for heating and ventilating automotive vehicles, such as passenger cars and trucks, and such apparatus have been installed to provide for discharge of heating or ventilating air into the vehicle body in many ways. My present invention is concerned primarily with such apparatus arranged to discharge the heated or ventilating air beneath a seat of the vehicle. For passenger car installations, a most convenient arrangement resides in disposal of the apparatus outlet beneath the front seat of the vehicle. In such position, the heater is out of the way of the driver and other occupants of the vehicle, and the space in which it is installed is not ordinarily utilizable for other purposes.

The arrangement of the heater beneath the vehicle seat, however, creates a problem for the effective distribution of the heating or ventilating air into the vehicle in view of the somewhat restricted nature of the area thus available. In known apparatus of the character to which the invention is directed embodying an air impeller, of the conventional propeller fan-type, difficulty is encountered in that such an impeller is not capable of delivering air under substantial pressure, with the result that the somewhat confined area below the seat interferes with the effective discharge of a substantial volume of air uniformly into the vehicle. It has been proposed, in view of the disadvantage noted, to incorporate a blower-type air impeller in that such an impeller is characterized by being capable of discharging air at high pressures. The conventional blower-type air impeller, in turn, has a disadvantage in that it normally embodies a scroll housing having a single outlet through which the air is discharged, and by virtue of that characteristic the blower unit is only effective to discharge air in one direction into the vehicle, which is not satisfactory for uniformly heating the vehicle.

It is an object of my invention to provide a heating and ventilating apparatus characterized by the provision of a unique blower and scroll housing assembly in which air under substantial pressure may be delivered from the blower housing, at a plurality of points thereof, into a vehicle body.

A preferred feature of my invention resides in providing a compact arrangement of a heat exchanger, a blower and scroll housing assembly, and motor for driving the blower to enable the convenient installation of such apparatus beneath the seat of a vehicle.

A further preferred feature resides in providing a blower and scroll housing assembly as aforesaid, in which the scroll housing includes a plurality of circumferentially spaced outlet throats for delivering air from the blower in different directions from the periphery of the housing.

The above and other objects and features of my invention will appear from the detail description.

Now, in order to acquaint those skilled in the art with the manner of constructing and using heating and ventilating apparatus in accordance with my invention, I shall describe, in accordance with the accompanying drawings, a preferred embodiment of my invention.

In the drawings:

Figure 2 is a horizontal sectional view through the heating and ventilating apparatus of Figure 1, taken along the line 2—2 of Figure 1, and looking in the direction indicated by the arrows;

Figure 1:
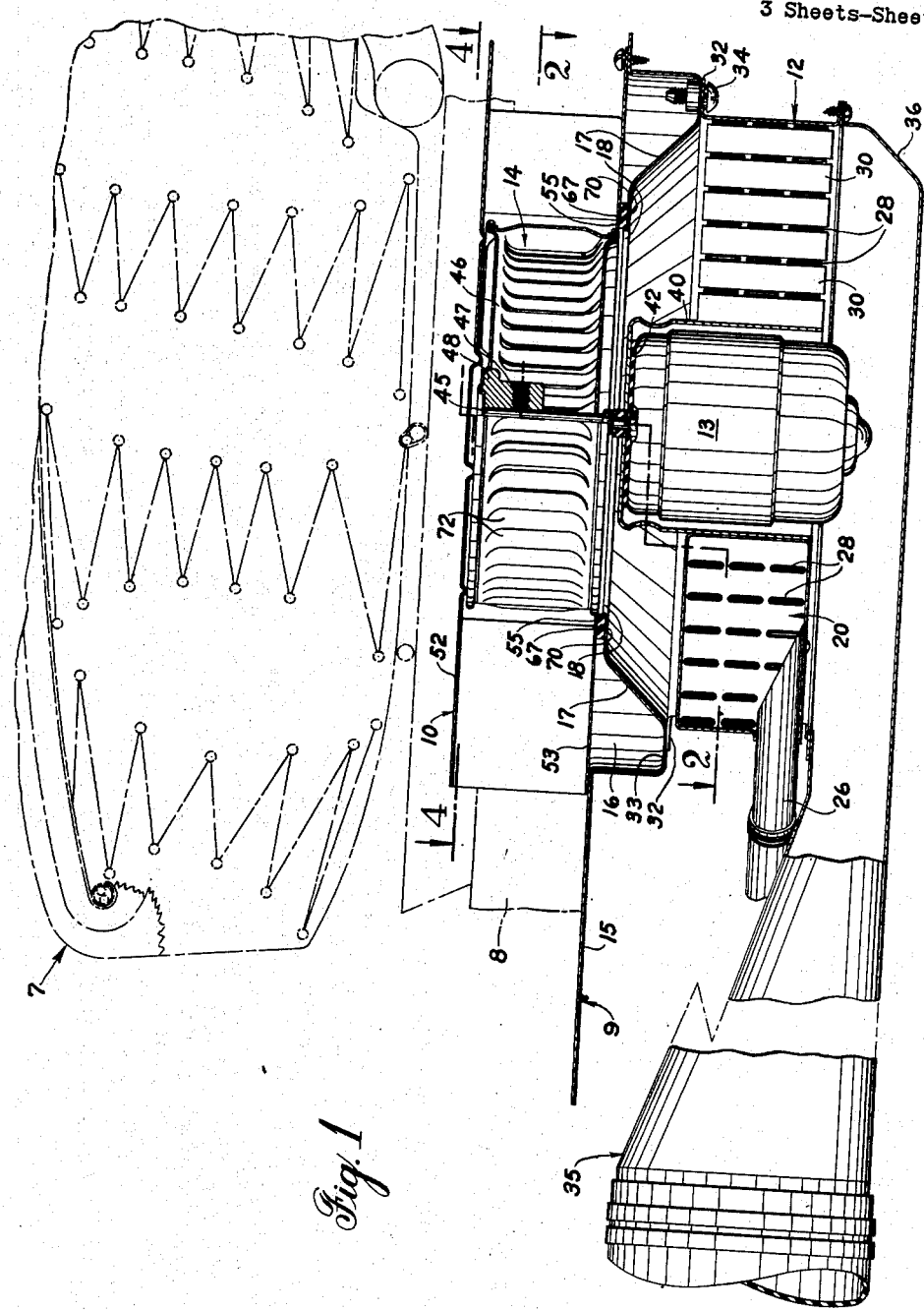
Figure 1 is a vertical sectional view taken substantially along line 1—1 of Figure 2, with certain parts in elevation, through a heating and ventilating apparatus constructed in accordance with my invention and illustrating, in dotted outline, a seat, such as the driver's seat of a passenger vehicle, to show the arrangement of the apparatus with respect to such seat.
Figure 4:
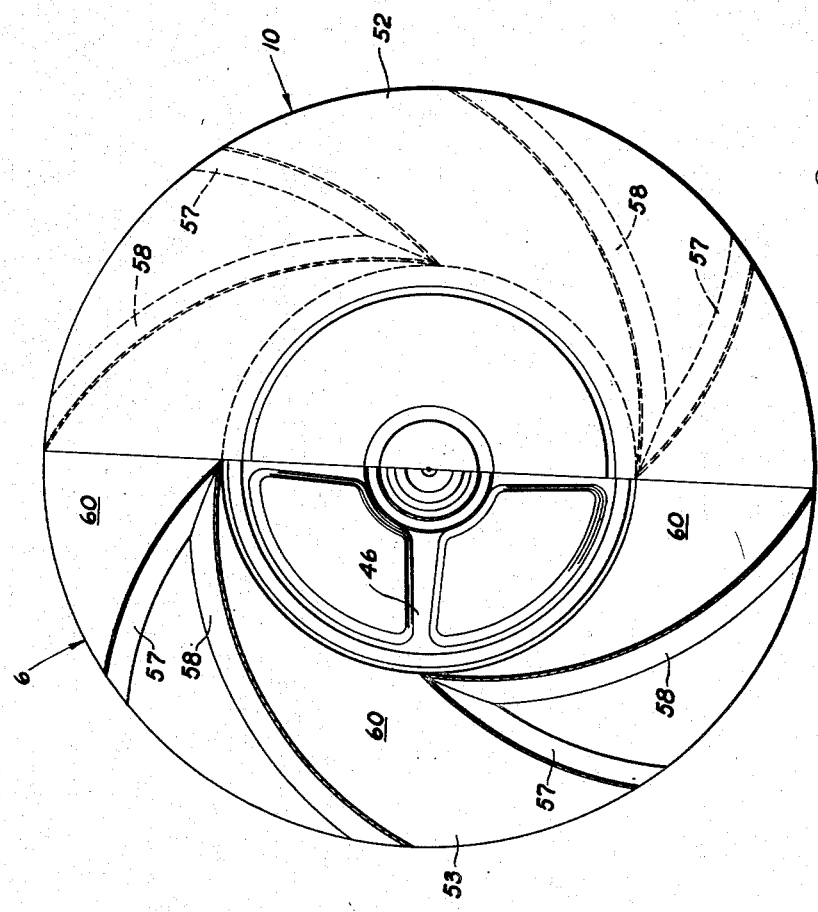

Figure 3 is a detail vertical sectional view showing the header construction for the heat exchanger, with the view being taken along the line 3—3 of Figure 2, looking in the direction indicated by the arrows; and Figure 4 is a part horizontal sectional view and a part plan view of the blower and scroll housing assembly, with the view being taken along the line 4—4 of Figure 1, looking in the direction indicated by the arrows.

Referring now to the drawings, a heating and ventilating apparatus, constructed in accordance with my invention, is indicated generally by the reference numeral 6. The apparatus is adapted, in its preferred embodiment in an automotive vehicle, to be mounted below a seat, indicated generally at 7 in Figure 1 of the drawings. The seat 7 may be of any desired and known construction, and preferably is arranged for support on a suitable track, indicated diagrammatically at 8, to provide a space between the base of the seat and the floor 9 of the vehicle. The seat 7 may, for example, be the front or driver's seat of an automotive vehicle, and the heating and ventilating apparatus, indicated at 6, may be disposed to the right of the driver.

The heating and ventilating apparatus 6 comprises, in the main, a blower housing, indicated generally at 10, disposed to lie above the floor 9 of the vehicle, between the floor and the seat, a heat exchanger, indicated generally at 12, disposed below the floor, and an electric motor 13 which drives a blower 14, disposed within the blower housing 10.

Upon reference to Figure 1, it will be observed that the floor 9 includes a substantially horizontally extending portion 15 and a depressed annular well 16, having a centrally disposed downwardly and outwardly extending frusto-conical portion 17, defining an opening 18 in the floor. The blower housing 10, as illustrated, is disposed above the floor, and the heat exchanger 12 and motor 13, as previously referred to, are disposed below the floor at the opening to provied for a compact arrangement of the heating and ventilating apparatus in an automotive vehicle. The heat exchanger 12, as shown in Figures 1 and 2, is of annular form and comprises a header 20, fabricated of sheet metal or the like, and having an inlet chamber 22 and an outlet chamber 23. The inlet chamber 22 is formed with a suitable opening to receive a conduit 25 for conducting the cooling medium of the cooling system for an internal combustion engine mounted in the vehicle, to provide a source of heat for the heat exchanger. A conduit 26 is suitably mounted, with respect to the outlet chamber 23 of the header 20, for returning the cooling medium to the cooling system for the prime mover of the vehicle. The heat exchanger 12 further comprises a plurality of thin vertically elongated substantially circular tubes 28 arranged in concentric and vertically spaced relation, through which the cooling medium is circulated from the inlet chamber 22 to the outlet chamber 23 of the header 20. Between the several elongated tubes 28 there are arranged thin heat dissipating fins 30 for effecting the rapid transfer of heat to the air flowing through the heat exchanger. The heat exchanger is of conventional construction in the respects noted, and further is provided with a peripheral flange 32 which is adapted to be secured to the base portion 33 of the annular depressed well 16 of the floor, by a plurality of screws 34. Preferably, the heat exchanger 12 is of a size to fit about the periphery of the downwardly and outwardly depending frusto-conical portion 17 of the floor, with the frusto-conical portion serving as a guide for guiding the air to the opening 18 in the floor for admission into the blower housing 10, as will be presently described. For purposes of admitting air to the heat exchanger to be heated, I propose to provide a conduit or duct, indicated generally at 35, which is provided with a pan portion 36 secured about its periphery to the bottom or base of the heat exchanger 12. Air is thus conducted through the conduit 35, the pan portion 36 thereof, through the heat exchanger 12, through the frusto-conical portion of the floor 17, and thence through opening 18 formed in the floor. An inverted sheet metal, cup-shaped housing 40 is mounted centrally of the heat exchanger and provides for the support of the electric motor 13, as best shown in Figure 1. Preferably, a resilient gasket 42 is mounted between the adjacent end portion of the housing for the motor 13 and the closed end wall of the cup-shaped member 40 to cushion the motor in the heat exchanger, to absorb shock and to prevent rattling between the parts. The motor 13 is provided with a conventional armature shaft 45, to which a blower of the sirocco type is secured by a set screw 47 passing through a hub portion 48 of the blower and into engagement with the armature shaft 45. The blower wheel 46 is adapted, upon energization of the motor, to create suction at the opening 18 in the floor to induce circulation of air through the conduit 35 and the heat exchanger 12 to the inlet of the blower.

The blower housing, as best shown in Figures 1 and 4, comprises substantially parallel spaced apart upper and lower end walls 52 and 53, respectively, with the bottom or lower end wall 53 being formed with an opening 55 aligned with the floor opening 18 for admitting air to the blower wheel 46. The upper and lower end walls of the blower housing are maintained in spaced apart relationship by means of a plurality of partition elements 57 and 58, which are suitably flanged at their upper and lower ends for mounting to the inner surfaces of the end walls 52 and 53, as by spot welding or the like. The partition elements 57 and 58 are of curved configuration and extend inwardly of the outer peripheries of the end walls 52 and 53 and toward the periphery of the blower wheel 46, to define a plurality of circumferentially spaced curvilinear outlet throats 60. The arrangement is such, in the present embodiment of the invention herein disclosed, to provide four partition elements 57 and four partition elements 58 to define four outlet throats 60. As best seen in Figure 2, the partitions are curved on different arcs. The inner edge of a partition 57 is joined with the inner edge of a partition 58 to provide an irregular curved substantially V-shaped member, as viewed in plan. The plurality of such arrangement of pairs of partition elements 57 and 58 provide for maintaining the end walls 52 and 53 in fixed spaced relation, and with each partition 57, together with the next adjacent partition element 58, defining a curvilinear throat for the discharge of air from the blower housing by the blower wheel.

It will be observed that the axis of the armature shaft of the motor 13 extends substantially at right angles to the planes of the end walls 52 and 53, and that the end walls 52 and 53 are of substantially greater diameter than the diameter of the blower wheel 46 so that the outer peripheral portions of the end walls 52 and 53, together with the partition elements 57 and 58, define curvilinear discharge throats 60 for the blower housing. It will be observed that a rubber gasket 67 is arranged to lie between the lower end wall 53 and the flat horizontal ringlink portion 70, at the inner end of the frusto-conical portion 17, to provide for a resilient mounting of the lower end wall 53, with the frusto-conical portion of the floor about the opening through which the air passes into the blower housing. The blower wheel 46 is of conventional construction and includes a plurality of blades 72 for effecting the discharge of air, admitted to the blower, through the blower housing at substantial pressure through the several outlet throats 60.

A suitable valve may be provided for controlling the flow of a heating medium through the heat exchanger, as desired by the operator of the vehicle, so that upon admission of such heating medium to the heat exchanger and the admission of air through the duct 35, heated air may be discharged from the blower housing at several points about the periphery of the housing for effecting substantially uniform distribution of air from the confined area between the seat and the floor and into the body of the vehicle. If ventilating air only is desired, the flow of the heating medium through the inlet and outlet connectors 25 and 26 may be closed by a suitable valve under the control of the driver, and in which event unheated air is caused to be delivered into the vehicle.

It will be understood that the conduit 35 may have connection in any suitable manner with a source of fresh air, which may be controlled by a baffle or supplemental blower or other air impelling mechanism to provide the supply of heating or ventilating air to the heating and ventilating apparatus 6 for purposes of heating or ventilating a vehicle in which the apparatus is installed.

While I have shown and described what I consider to be a preferred embodiment of my invention, it will be understood that various modifications and rearrangements may be made therein without departing from the spirit and scope of my invention.

I claim:

1. In an apparatus of the class described, the combination of a floor having a substantially horizontally extending portion and a depending, downwardly and outwardly extending frusto-conical portion defining an opening therein, a blower housing disposed above said floor comprising a pair of parallel spaced upper and lower horizontally extending end walls, said lower end wall having a central opening aligned substantially with the opening in said floor, a heat exchanger mounted below the lower end of the frusto-conical portion of said floor, air inlet means communicating with said heat exchanger for directing air across the latter, a motor mounted within said heat exchanger and having an armature shaft projecting upwardly into said blower housing on an axis lying substantially at right angles to the planes of said end walls, a blower carried at the upper end of said armature shaft and disposed between said end walls of said blower housing in coaxial alignment with the opening in said lower end wall, and a plurality of curved partition elements secured transversely between said end walls and extending inwardly from the peripheries of said end walls to substantially the periphery of said blower, said partition elements being cooperatively paired and joined substantially in V relation with such pairs thereof being spaced apart to define a plurality of circumferentially spaced curvilinear and divergently opening outlet throats therebetween.

2. For use with a heat exchanger in an apparatus of the class described, the combination comprising, a blower housing having a pair of superposed parallel spaced walls, one of said walls having a central opening formed therein, a plurality of curvilinear partition elements transposed between said walls, said partition elements being paired in relatively short and long lengths and interjoined at one end substantially in V formation, such pairs of elements being symmetrically spaced between said walls with their apexial ends adjacent the periphery of said opening in said one wall thereby to define a plurality of separated throat outlets comprising the vacancies between adjacent pairs of partition elements, said throat outlets each diverging uniformly outward from said opening in said one wall, and a rotatably driven blower wheel mounted coaxially of said one wall opening and intermediate said two walls for delivering air substantially tangentially to said throat outlets.

References Cited in the file of this patent
UNITED STATES PATENTS

| Number | Name | Date |
|---|---|---|
| 1,030,561 | Blackmer et al. | June 25, 1912 |
| 2,126,230 | Troxell, Jr. | Aug. 9, 1938 |
| 2,249,946 | Darrah et al. | July 22, 1941 |
| 2,256,724 | Onishi et al. | Sept. 23, 1941 |
| 2,301,045 | Heath | Nov. 3, 1942 |
| 2,332,969 | Higley | Oct. 26, 1943 |
| 2,333,818 | Raney | Nov. 9, 1943 |